United States Patent [19]

Nimura et al.

[11] Patent Number: 4,794,285

[45] Date of Patent: Dec. 27, 1988

[54] VEHICLE AC GENERATOR WITH VOLTAGE REGULATOR

[75] Inventors: Takayasu Nimura, Nagoya; Tsutomu Shiga, Aichi, both of Japan

[73] Assignee: Nippondenso Co., Ltd., Kariya, Japan

[21] Appl. No.: 57,733

[22] Filed: Jun. 2, 1987

Related U.S. Application Data

[63] Continuation of Ser. No. 665,496, Oct. 29, 1984, abandoned, which is a continuation of Ser. No. 213,491, Dec. 5, 1980, abandoned.

[30] Foreign Application Priority Data

Dec. 14, 1979 [JP] Japan ................... 54-162439

[51] Int. Cl.$^4$ ............................................. H02K 9/06
[52] U.S. Cl. ................................. 310/68 D; 310/62
[58] Field of Search ............. 310/68 R, 68 D, 59, 310/60 R, 61, 62, 90, 263

[56] References Cited

U.S. PATENT DOCUMENTS

| | | |
|---|---|---|
| 2,368,320 | 1/1945 | Norris . |
| 2,819,417 | 1/1958 | Glass .................... 310/90 |
| 3,184,625 | 5/1965 | Farison ............. 310/68 R |
| 3,230,404 | 1/1966 | Graham . |
| 3,253,167 | 5/1966 | Bates et al. . |
| 3,329,841 | 7/1967 | Binder et al. ........... 310/68 R |
| 3,407,317 | 10/1968 | Honsinger ............ 310/68 R |
| 3,422,339 | 1/1969 | Baker ................... 310/68 R |
| 3,445,694 | 5/1969 | Campbell et al. . |
| 3,534,204 | 10/1970 | Groezinger . |
| 3,548,226 | 12/1970 | Sato . |
| 3,617,782 | 11/1971 | Nakamura et al. . |
| 3,701,911 | 10/1972 | Hallerback ............ 310/60 |
| 3,848,145 | 11/1974 | Goebel et al. .......... 310/62 |
| 4,087,713 | 5/1978 | Binder . |
| 4,162,419 | 7/1979 | DeAngelis ........... 310/68 D |
| 4,418,295 | 11/1983 | Shiga ................... 310/59 |
| 4,421,998 | 12/1983 | Ahner et al. . |
| 4,549,103 | 10/1985 | Shiga ................... 310/59 |

FOREIGN PATENT DOCUMENTS

| | | |
|---|---|---|
| 1181118 | 1/1985 | Canada . |
| 27-4810 | 6/1952 | Japan . |
| 47-25812 | 4/1971 | Japan . |
| 48-12505 | 6/1971 | Japan . |
| 49-56402 | 8/1972 | Japan . |
| 47-42264 | 12/1972 | Japan . |
| 50-28617 | 3/1975 | Japan . |
| 52-156908 | 5/1976 | Japan . |
| 52-22128 | 5/1977 | Japan . |
| 54-48917 | 9/1977 | Japan . |

OTHER PUBLICATIONS

Nippon Denso Technical Disclosure, No. 13-071; 1-2-9-79.
Delco-Remy: Electrical Equipment Brochure, 8-1-67; 1968, Delco-Remy Brochure, 10-1-67; and Automotive Industries, Apr. 1, 1973.
Taschenbuch Elektrotechnik, 1966, vol. 2, Band 2, Starkstromtechnik, pp. 205-206.

Primary Examiner—Patrick R. Salce
Assistant Examiner—D. L. Rebsch
Attorney, Agent, or Firm—Cushman, Darby & Cushman

[57] ABSTRACT

An alternate current generator having a housing consisting of directly coupled frame pieces and a stator core fixed directly to the inside surface of one of said frame pieces and a pair of fans fixed to the side surfaces of the pole cores of the rotor, mainly in order to increase the structural strength and the cooling efficiency of the generator. The housing is dimensioned such that stator windings receive a maximum of cooling air.

9 Claims, 3 Drawing Sheets

VEHICLE AC GENERATOR WITH VOLTAGE REGULATOR

This is a continuation of application Ser. No. 665,496, filed Oct. 29, 1984, which was abandoned upon the filing hereof, and which is a continuation of application Ser. No. 213,491, filed Dec. 5, 1980, now abandoned.

TECHNICAL FIELD

The present invention relates to an alternating current generator with a voltage regulator unit used, for example, in vehicles.

BACKGROUND ART

The rotational speed of the alternating current generator used in vehicles can be increased by using a poly V belt as the driving means. In order to realize such a high speed alternating current generator, it is necessary to make the structure of the generator firm so as to reduce flection of the axis of the generator, to reduce vibrations of the generator, to give the generator an excellent centrifugal force characteristic, and hence to make the generator competent to withstand the high speed rotation. Also, it is necessary to provide an excellent cooling system in which stator windings, rectifiers, a regulator of the integral circuit type, rotor winding and bearings can be cooled in a suitable manner. Further, it is necessary to reduce the noise of the generator when rotating, which noise arises from the friction between the blades of the cooling fan in the generator and the air.

The present invention is directed to improve the structure of the alternating current generator so as to comply with the above described requirements for the high speed rotation of the alternating current generator.

DISCLOSURE OF THE INVENTION

It is the main object of the invention to create a high speed alternating current generator which has increased structural strength, exerts reduced vibration and performs efficient cooling of the heat generating portions of the generator and the associated elements.

In accordance with the present invention, there is provided an alternating current generator comprising a shaft, pole cores of a rotor fixed to said shaft, a rotor winding wound around said pole cores, a stator core arranged around said rotor, a stator winding wound around said stator core and a housing encasing said rotor and said stator, wherein said alternate current generator is characterized in that: said housing consists of a pair of frame pieces which are coupled directly to each other, said stator core is fixed directly to the inside surface of one of said frame pieces, a pair of bearing boxes are arranged in the central portions of said frame pieces inside of said housing form by said pair of frame pieces, a pair of fans are fixed to the side surface of said poles cores of said rotor, and; the associated elements including slip rings, brushes, rectifiers and a voltage regulator unit are located outside of said housing formed by said frame pieces.

DESCRIPTION OF THE PREFERRED EMBODIMENTS

Figure 1:
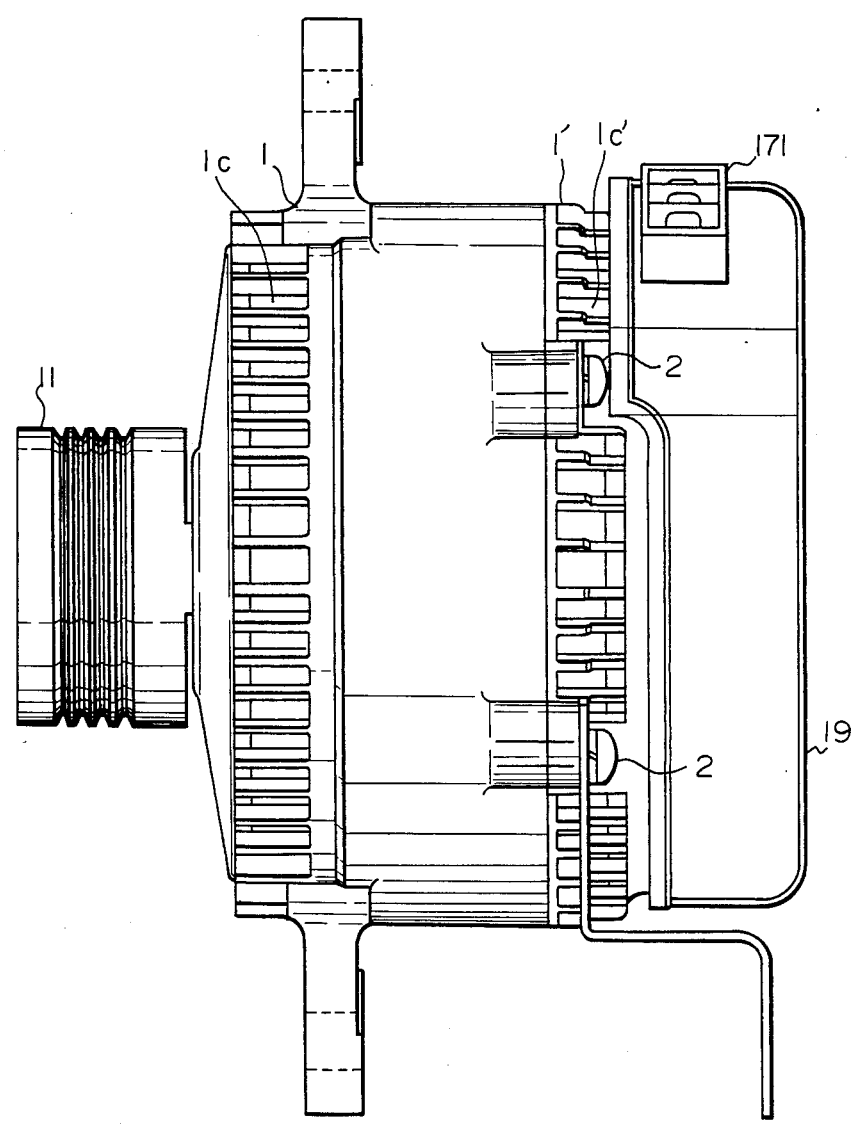
FIG. 1 illustrates an elevational view of the alternating current generator as an embodiment of the present invention.
Figure 2:
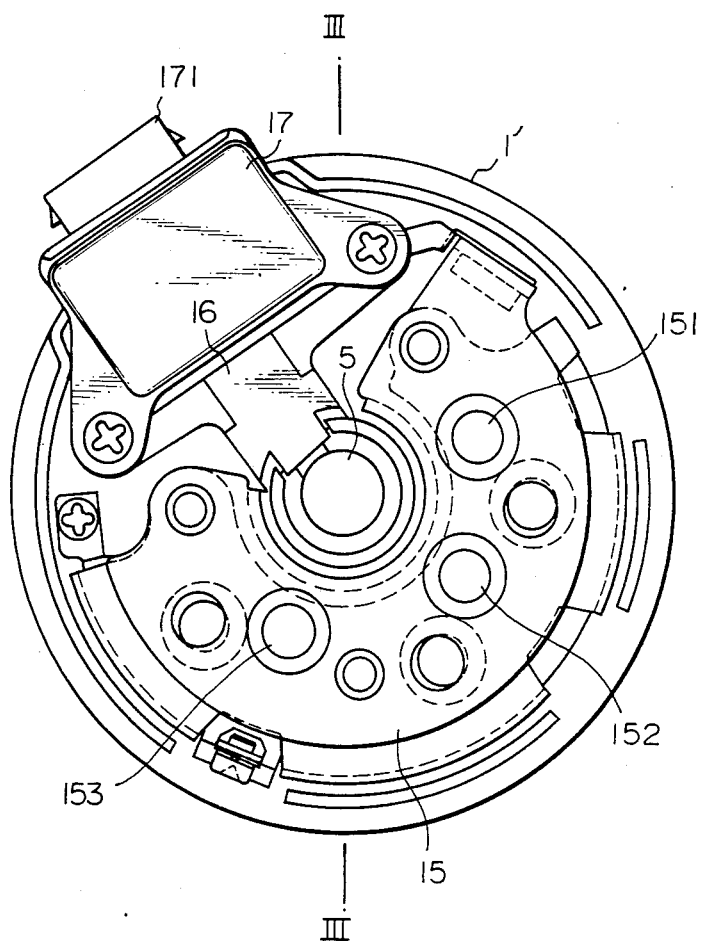
FIG. 2 illustrates a side view of the alternating current generator of FIG. 1 in which the rear cover is removed.
Figure 3:
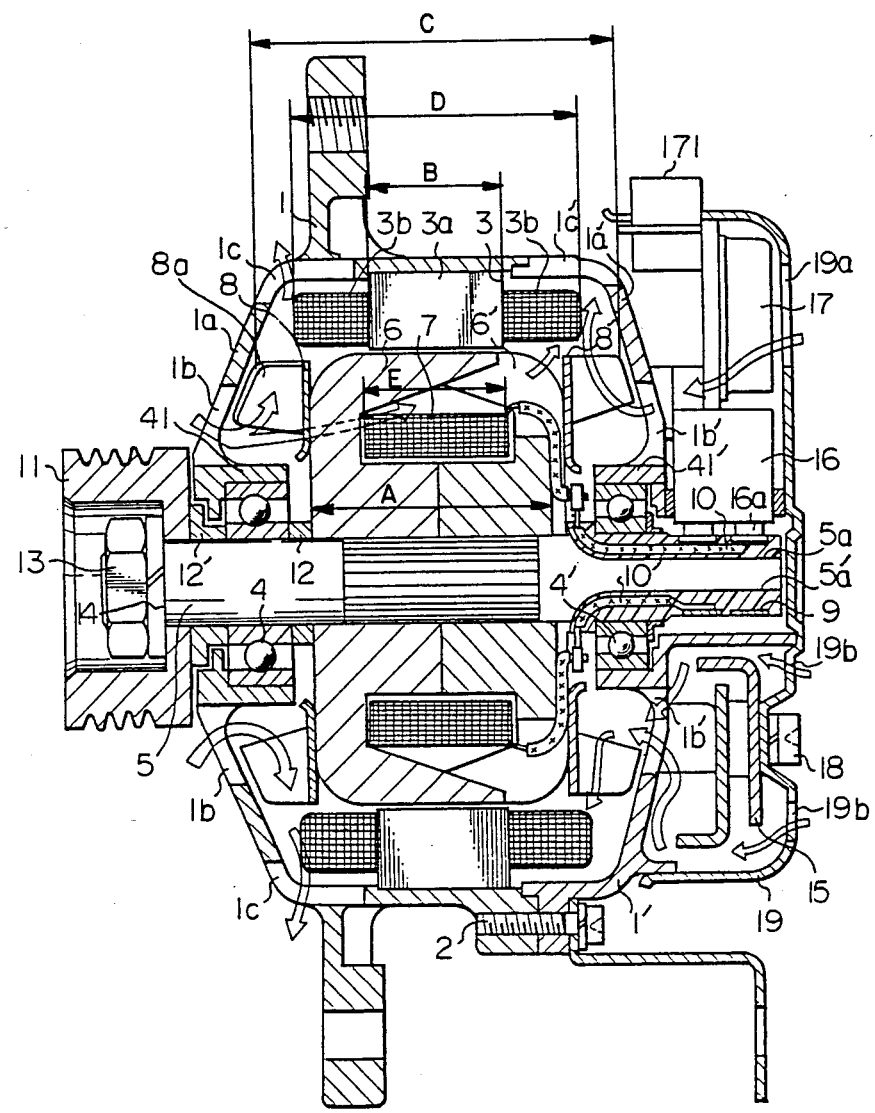
FIG. 3 is a cross-sectional view of the alternating-current generator of FIG. 2 as an embodiment of the present invention, taken along line III—III.

The structure of the alternating current generator in accordance with an embodiment of the present invention is illustrated in FIGS. 1, 2 and 3. The housing of the generator consists of a pair of frame pieces 1 and 1' which directly connect with each other at their circular edges to form an area to accomodate the operative members of the alternating current generator. The frame pieces 1 and 1' are fixed to each other by through bolts only one of which is illustrated as a through bolt 2 in FIG. 3.

The bearing boxes 41 and 41' are fixed to the inner central portions of the frame pieces 1 and 1' and accomodate the bearings 4, 4' through which a shaft 5 is penetrated. Because the frame pieces 1 and 1' are coupled directly and firmly to each other, the precise positioning of the bearing boxes 41, 41' and the bearings 4, 4' is attained and errors in the positions of the centers of the bearings 4, 4' are minimized, and accordingly the precise support of the shaft 5 is attained. This helps the high speed rotation of the shaft 5 and reduces the vibration during the high speed rotation of the shaft 5.

The axial length of the housing formed by the frame pieces 1 and 1' decreases from the axis portion toward the circumferential portion. Accordingly, the housing has a swollen shape similar to the shape of an egg as illustrated in FIG. 3. This shape is advantageous because of the increased structural strength of the generator.

A core 3a of a stator 3 is fixed directly to the inside of the frame 1. The entire outside surface of the core 3a of the stator 3 contacts the inside surface of the frame 1. Heat generated in the stator core is conducted through said entire surface to the frame. This helps the efficient cooling of the stator. A stator winding 3b is wound around the stator core 3a.

The rotor core fingers 6 and 6' are offset circumferentially with respect to each other, as is well known to a person skilled in the art. The pole core of the rotor is located inside of the stator 3 and is fixed to the shaft 5. A rotor winding 7 is wound around the pole core of the rotor.

Cooling fans 8 and 8' are fixed to the side surfaces of the pole cores 6 and 6' of the rotor. The diameter of each of the cooling fans 8 and 8' is smaller than the inner diameter of the stator 3. Blades of the cooling fans 8 and 8' extend in outward directions. The number of the blades 8a of the cooling fane 8 is the same as the number of the rotor core fingers 6. The number of the blades of the cooling fan 8' is determined in accordance with the flow rate of the coolant air. The cooling fan 8 is of a mixed flow type having slant blades 8a so as to forward the coolant air to the rotor not only in the radial direction, but also in the axial direction so that the rotor core is sufficiently cooled by the coolant air (The blade 8a is slanted in the direction of rotation.) The cooling fan 8' is of a centrifugal type.

The fresh coolant air is drawn through the intake windows 1b and 1b' formed adjacent to the bearing boxes 41 and 41' in the frame pieces 1 and 1'. The heated coolant air is exhausted through the exhaust windows 1c and 1c' formed adjacent to the stator 3 in the frame pieces 1 and 1'.

Slip rings 9 are connected to the rotor winding 7 through conductors 10, 10' arranged in slots 5a, 5a' in the shaft 5. The slip rings 9 are arranged on the shaft 5, adjacent to the position of the bearing 4' and outside of the frame pieces 1, 1'.

A pulley 11 having four grooves is fixed to one end of the shaft 5 by a screw nut 13 and a washer 14. Collars 12 and 12' are inserted between the rotor core 6 and the bearing 4 and between the bearing 4 and the pulley 11. The pulley 11 is driven by an engine through a poly V belt (not shown).

A diode fin 15 carrying diodes, brushes 16a supplying an excitation current to the rotor winding through the slip ring 9 and conductors 10, 10', brush holders 16, and a voltage regulator unit 17 of the hybrid integral circuit type (so-called the IC type) for controlling the field current of the generator are arranged outside of the frame pieces 1, 1' and are accomodated in a rear cover 19 which is fixed to the frame pieces 1' by bolts 18. Only one of said bolts 18 is illustrated in FIG. 3. The rear cover 19 serves as a protective cover for the above described elements accomodated in the rear cover 19 outside of the frame pieces 1, 1'. Windows 19a and 19b are provided in the rear cover 19 for the cooling of the regulator 17 and the diode fin 15. Diodes 151, 152 and 153 are located in the recesses on the diode fin 15 (FIG. 2). The heat generated in the diodes is effectively dissipated in the coolant air through the diode fin.

An electrical connector 171 is provided adjacent to the regulator 17 to form an electrical connection to a storage battery and the like. Because all of the main static electrical elements, such as diodes, brushes, brush holders, a regulator and an electrical connector are arranged compactly outside of the frame pieces 1, 1' and in the space formed by the rear cover 19, only a small length of the conductors is required for the electrical connections among the main static electrical elements.

In operation, the coolant air drawn through the window 1b cools in sequence the bearing 4 and the stator winding 3b, and the resultant heated coolant air is exhausted through the window 1c. A portion of the coolant air drawn through the window 1b is pushed into the rotor structure through the gaps between the rotor core fingers 6, 6' to cool the rotor winding 7, passes through the stator winding 3b, and is exhausted through the window 1c'.

Simultaneously with the above described cooling, the coolant air drawn through the windows 19a, 19b of the rear cover 19 cools either the regulator 17 or the diode fin 15, and is then drawn into the housing formed by the frame pieces 1 and 1' through the windows 1b'. The coolant air drawn into the housing cools in sequence the bearing 4' and the stator winding 3b and the resultant heated coolant air is exhausted through the window 1c'.

We claim:

1. An alternating current generator for use in a vehicle comprising:

a housing including a circumferential portion extending between spaced apart axial side portions, each of said axial side portions having a central portion and means defining a plurality of intake ports adjacent said central portion for permitting air passage therethrough, each of said axial side portions extending obliquely between said central and circumferential portions in such a manner that the axial length of said housing decreases from said central portions towards said circumferential portion, said circumferential portion further including means defining first and second air exhaust ports spaced from each other;

a stator assembly, including a stator core fixed to an inner surface of said circumferential portion at a location between said first and second air exhaust ports, said stator core having an axial width (B) which is smaller than that of said rotor core (A) and a stator winding wound around said stator core;

a rotor assembly, including a rotor shaft, a rotor coil, and a rotor core fixed to the rotor shaft for rotation therewith and comprising interleaved pole members which define a plurality of angularly separated fingers having axially extending spaces therebetween;

bearing means in the central portion of each of said axial side portions for rotatably supporting said rotor shaft;

a first fan provided on one side of said pole members of said rotor, said first fan having a plurality of blades, the outside of said blades being positioned close to one of said axial side portions and extending substantially parallel to the inclination of the obliquely extending portion of said one axial side portion, whereby during rotation of the rotor core said first fan draws air through said intake ports in said one axial side portion and directs the air radially of the housing past said stator winding along an inner surface of said one axial side portion and through said first air exhaust ports in said circumferential portion and axially of said housing through said spaces between said fingers, and between said rotor and stator core; and a second fan provided at the other end of said rotor core for rotation therewith and having a plurality of blades, the outside of said blades being close to the other of the said axial side portions and extending substantially parallel to the inclination of the obliquely extending portion of said other axial side portion, whereby during rotation of the rotor core, said second fan draws air through said intake ports in the other of said axial side portions and directs the air radially of the housing past said stator winding along an inner surface of the other of the said axial side portions and through said second air exhaust ports in said circumferential portion;

wherein said stator winding has an axial width (D) which is less than the axial distance (C) defined by the outer sides of said first and second fans so that the air flow established by each of said first and second fans is directed toward said stator winding along the respective interior surfaces of said axial side portions.

2. A generator according to claim 1, including slip rings, brushes, rectifiers and a voltage regulator until wherein at least said rectifiers and the voltage regulator are positioned outside of said housing so that the air flow established by said second fan flows past said rectifiers and said voltage regulator unit to cool them before said air flow is introduced into said housing.

3. A generator according to claim 1, wherein said housing comprises a pair of frame pieces directly coupled to each other.

4. A generator according to claim 1, wherein said bearing means includes a pair of bearings arranged adjacent said rotor care.

5. A generator according to claim 1, wherein the diameter of each of said fans is smaller than the inner diameter of said stator.

6. A generator according to claim 1, wherein said housing comprises a pair of frame pieces directly coupled to each other.

7. A generator according to claim 1, wherein said bearing means includes a pair of bearings arranged adjacent said rotor core.

8. A generator according to claim 1, wherein the diameter of each of said fans is smaller than the inner diameter of said stator.

9. A generator according to claim 1, wherein said stator winding has an axial width (D) which is less than the axial width between the outer sides of said first and second air exhaust ports.

* * * * *